United States Patent
Yamazaki et al.

(10) Patent No.: US 6,823,722 B2
(45) Date of Patent: Nov. 30, 2004

(54) ADSORBENT STATE DETERMINING APPARATUS

(75) Inventors: Hideharu Yamazaki, Saitama-ken (JP); Kei Machida, Saitama-ken (JP); Masaki Ueno, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 10/290,215

(22) Filed: Nov. 8, 2002

(65) Prior Publication Data

US 2003/0089165 A1 May 15, 2003

(30) Foreign Application Priority Data

Nov. 12, 2001 (JP) ........................................ 2001-346771

(51) Int. Cl.⁷ .......................... G01N 5/02; G01M 19/00
(52) U.S. Cl. ......................................... 73/73; 73/118.1
(58) Field of Search ..................... 73/118.1, 73, 31.05, 73/335.05, 29.01, 23.31, 23.32, 116, 117.2, 117.3; 60/295, 274, 276; 374/144, 28; 123/568.16; 204/424–429

(56) References Cited

U.S. PATENT DOCUMENTS 4,801,211 A * 1/1989 Yagi et al. .................... 374/28
6,601,444 B2 * 8/2003 Ohmori et al. ............. 73/118.1
6,641,303 B2 * 11/2003 Yamazaki et al. ........... 374/144
6,647,972 B2 * 11/2003 Sato et al. .............. 123/568.16

* cited by examiner

*Primary Examiner*—Edward Lefkowitz
*Assistant Examiner*—Octavia Davis
(74) *Attorney, Agent, or Firm*—Westerman, Hattori, Daniels & Adrian, LLP

(57) ABSTRACT

An adsorbent state determining apparatus is provided for accurately determining the state of an adsorbent including a deterioration while ensuring elimination of the influence of impurities sticking on a sensor element of a humidity sensor. The adsorbent state determining apparatus determines the state of an adsorbent disposed in an exhaust system of an internal combustion engine for purifying exhaust gases. The adsorbent is capable of adsorbing hydrocarbons and moisture within exhaust gases. The adsorbent state determining apparatus comprises a humidity sensor disposed near the adsorbent in the exhaust system for detecting a humidity of exhaust gases; a heater for executing cleaning for removing impurities sticking on a sensor element of the humidity sensor; and an ECU for determining whether or not the heater has completed the cleaning, and for determining the state of the adsorbent in accordance with the humidity of exhaust gases detected by the humidity sensor when the ECU determines that the cleaning is completed.

3 Claims, 14 Drawing Sheets

ADSORBENT STATE DETERMINING APPARATUS

BACKGROUND OF THE INVENTION

1. Field of the Invention

The present invention relates to an adsorbent state determining apparatus for determining the state of an adsorbent arranged in an exhaust system of an internal combustion engine for adsorbing hydrocarbons and moisture in exhaust gases to purify the exhaust gases.

2. Description of the Prior Art

Some internal combustion engines are provided with an adsorbent for adsorbing hydrocarbons in exhaust gases upon starting. The adsorbent has, for example, zeolite on the surface such that hydrocarbons in exhaust gases introduce into pores of zeolite when they pass through the adsorbent, and are adsorbed by the adsorbent. The adsorbent desorbs the hydrocarbons once adsorbed thereby when the adsorbent is heated by exhaust gases to a predetermined temperature or higher (for example, 100–250° C.), permitting the desorbed hydrocarbons to be recirculated to the internal combustion engine through an EGR pipe and the like. While the adsorbent repeats the adsorption and desorption of hydrocarbons as described above, the remaining amount of hydrocarbons not desorbed may gradually increase in the adsorbent, or pores of the adsorbent may be broken during a long-term use. As a result, the adsorbent is deteriorated, causing a gradual degradation in the ability of the adsorbent to adsorb the hydrocarbons. When the internal combustion engine is started with such a deteriorated adsorbent, hydrocarbons not adsorbed by the adsorbent are emitted to the outside. It is therefore necessary to determine the state, more particularly, a deterioration of the adsorbent.

The applicant has already proposed a deterioration determining apparatus for determining a deterioration of an adsorbent as described above, for example, in Japanese Patent Application No. 2000-338375. This deterioration determining apparatus relies on a proportional relationship between the abilities of the adsorbent to adsorb hydrocarbons and moisture to determine a degradation in the abilities of the adsorbent to adsorb hydrocarbons and moisture, i.e., a deterioration of the adsorbent by detecting the humidity in exhaust gases using a humidity sensor after they pass the adsorbent. This adsorbent deterioration determination is executed when conditions for the execution are regarded as established, i.e., when an engine water temperature is within a predetermined range, when an absolute humidity of the internal combustion engine upon starting, detected by the humidity sensor, is within a predetermined range, and the like.

The humidity sensor comprises a sensor element which is made of a porous material having a large number of pores, and detects the humidity of exhaust gases as moisture in the exhaust gases introduces into the pores and is adsorbed therein when it passes through the sensor element. In this way, the humidity is detected with the sensor element exposed to exhaust gases, so that impurities such as water droplets produced by condensation, unburnt fuel components included in the exhaust gases, and the like can stick to the sensor element, in which case the humidity sensor fails to correctly detect the humidity of exhaust gases, resulting in the inability to correctly detect a deterioration of the adsorbent. To solve this problem, the deterioration determining apparatus cleans the sensor element using a heater for a predetermined time period for removing water droplets and the like sticking on the sensor element to recover the detection accuracy of the humidity sensor. Specifically, the heater is operated for the predetermined time period when the intake temperature is lower than a predetermined temperature before the start of the internal combustion engine, or when an idling operation continues for a predetermined time period or longer after the start of the internal combustion engine, on the assumption that the sensor element experiences condensation.

The foregoing deterioration determining apparatus, however, still leaves room for improvement in the following aspects. The deterioration determining apparatus executes a deterioration determination for the adsorbent when the engine water temperature is within a predetermined temperature range and when the absolute humidity upon start of the engine is within a predetermined range, on the assumption that the conditions for execution are established. Thus, impurities such as unburnt fuel components are possibly sticking on the sensor element upon establishment of the conditions for executing the deterioration determination, so that the deterioration determination is executed for the adsorbent with such impurities sticking on the sensor element. As a result, the humidity sensor suffers from a degraded detection accuracy caused by the impurities sticking on the sensor element, and accordingly fails to provide a sufficient accuracy for the deterioration determination.

OBJECT AND SUMMARY OF THE INVENTION

The present invention has been made to solve the problem mentioned above, and it is an object of the invention to provide an adsorbent state determining apparatus which is capable of accurately determining the state of an adsorbent, including a deterioration, while ensuring elimination of the influence of impurities sticking on a sensor element of a humidity sensor.

To achieve the above object, the present invention provides an adsorbent state determining apparatus for determining a state of an adsorbent disposed in an exhaust system of an internal combustion engine for purifying exhaust gases, where the adsorbent is capable of adsorbing hydrocarbons and moisture within exhaust gases. The adsorbent state determining apparatus is characterized by comprising a humidity sensor disposed near the adsorbent in the exhaust system for detecting a humidity of exhaust gases; cleaning executing means for executing cleaning for removing impurities sticking on a sensor element of the humidity sensor; cleaning completion determining means for determining whether or not the cleaning executing means has completed the cleaning; and adsorbent state determining means for determining the state of the adsorbent in accordance with the humidity of exhaust gases detected by the humidity sensor when the cleaning completion determining means determines that the cleaning is completed.

According to this adsorbent state determining apparatus, the cleaning executing means executes the cleaning for removing impurities sticking on the sensor element, and the adsorbent state determining means determines the state of the adsorbent in accordance with the humidity of exhaust gases detected by the humidity sensor when the cleaning completion determining means determines that the cleaning is completed. Thus, the state determination can be carried out using the humidity of exhaust gases which is detected when no impurities are sticking on the sensor element, thereby making it possible to accurately determine the state of the adsorbent while ensuring elimination of the influence by the impurities.

Preferably, in the adsorbent state determining apparatus, the cleaning executing means comprises a heat cleaning means for heating the sensor element of the humidity sensor to remove impurities.

According to this preferred embodiment of the adsorbent state determining apparatus, since the impurities are removed by the heat cleaning which heats the sensor element, it is possible to burn impurities sticking on the sensor element, for example, water droplets, unburnt fuel components, and the like without fail. Consequently, a high accuracy can be held for the detection of the humidity in exhaust gases by the humidity sensor, so that the state of the adsorbent can be accurately determined.

Preferably, in the adsorbent state determining apparatus, the adsorbent state determining means determines a deterioration of the adsorbent as the state of the adsorbent.

As described above, the abilities of the adsorbent to adsorb hydrocarbons and moisture are in a proportional relationship to each other, so that the humidity detected by the humidity sensor has a high correlation to hydrocarbons actually adsorbed in the adsorbent, i.e., the degree of deterioration of the adsorbent. According to the present invention, therefore, a deterioration of the adsorbent can be accurately determining while ensuring elimination of the influence by impurities.

DETAILED DESCRIPTION OF THE EMBODIMENT

Figure 1:
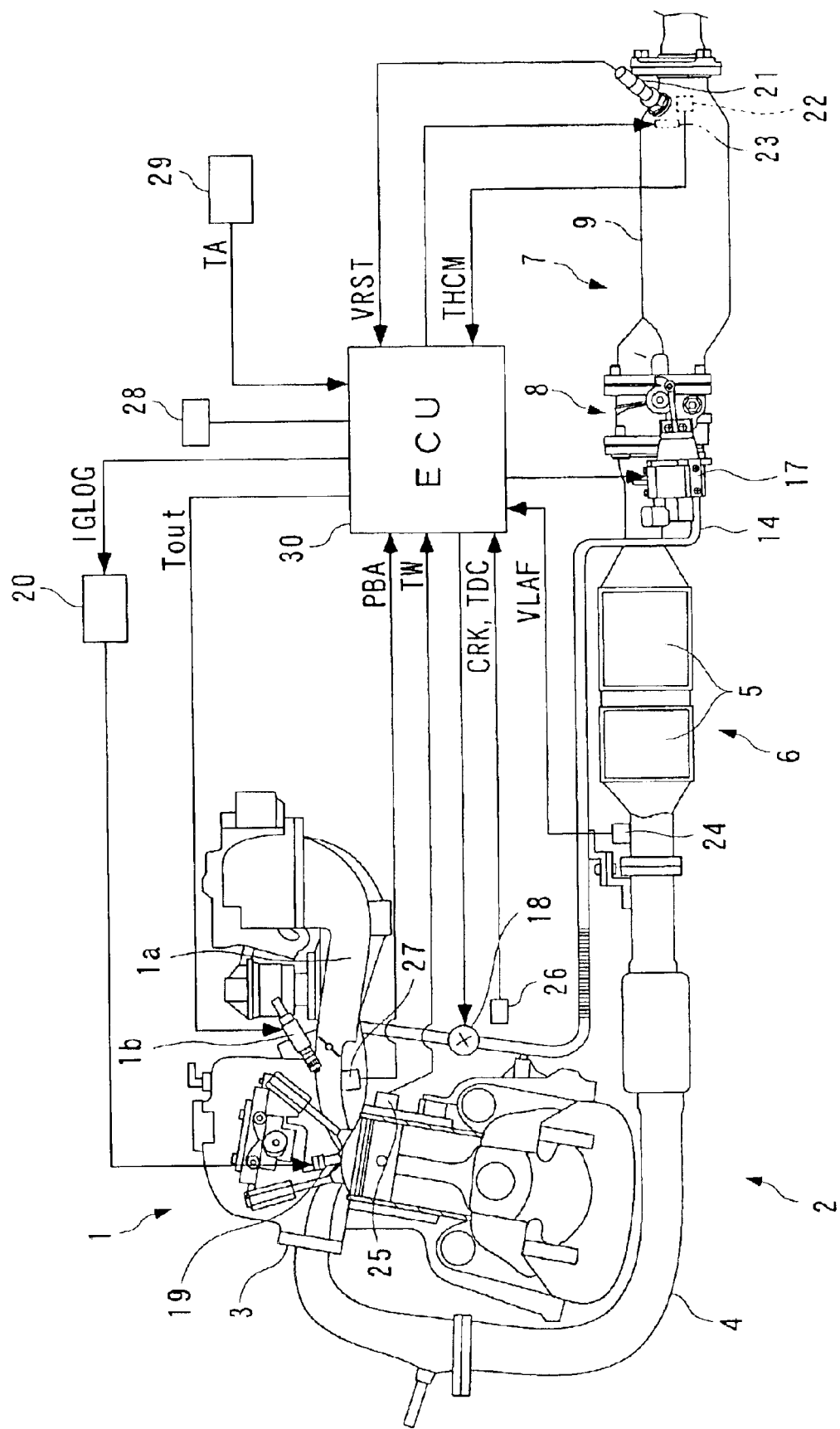
FIG. 1 is a diagram illustrating the configuration of an internal combustion engine which applies an adsorbent state determining apparatus according to one embodiment of the present invention.

In the following, a preferred embodiment of the present invention will be described in detail with reference to the accompanying drawings. FIG. 1 illustrates an internal combustion engine 1 which applies an adsorbent state determining apparatus according to one embodiment of the present invention. A humidity sensor 21a is arranged at a location downstream of an adsorbent 11. The internal combustion engine (hereinafter simply referred to the "engine") 1 is for example, a four-cylinder four-cycle engine equipped in a vehicle, not shown. An exhaust system 2 of the engine 1 has an exhaust pipe 4 connected to the engine 1 through an exhaust manifold 3. A catalyzer 6 having two three-way catalysts 5, and a hydrocarbon adsorber 7 for adsorbing hydrocarbons are provided at intermediate locations in the exhaust pipe 4 for purifying exhaust gases. The two three-way catalysts 5 of the catalyzer 6 are arranged adjacent to each other along the exhaust pipe 4. The three-way catalysts 5, when activated at or above a predetermined temperature (for example, 300° C.), purify harmful substances (hydrocarbons (HC), carbon monoxide (CO) and nitrogen compounds(NOx)) in exhaust gases passing through the catalyzer 6 by oxidation-reduction catalyst actions.

Figure 2:
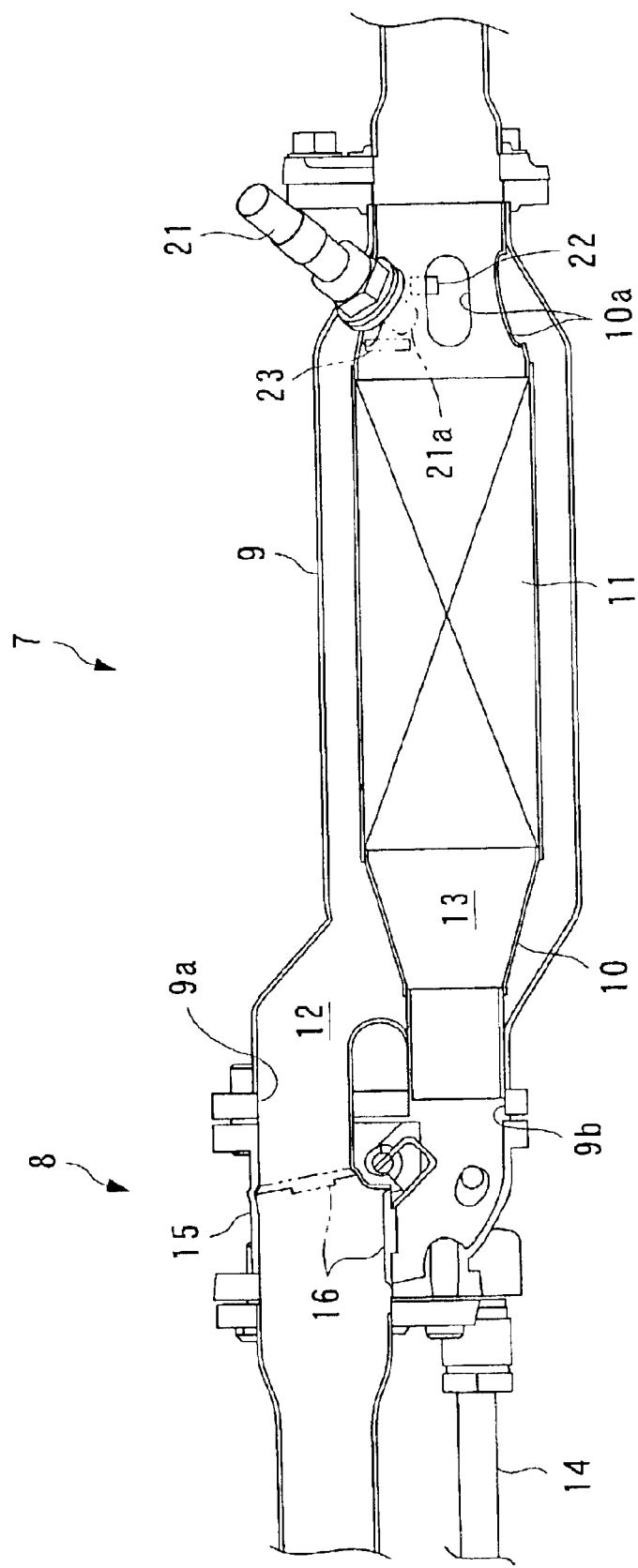
FIG. 2 is an enlarged cross-sectional view illustrating a hydrocarbon adsorber.

The hydrocarbon adsorber 7, in turn, is arranged in the exhaust pipe 4 at a location downstream of the catalyzer 6 for adsorbing hydrocarbons in exhaust gases during a starting period (for example, about 30–40 seconds after the start) of the engine 1 in a cold start state in which the three-way catalysts 5 have not been activated, thereby reducing the amount of hydrocarbons emitted to the atmosphere. As illustrated in FIGS. 1 and 2, the hydrocarbon adsorber 7 is coupled to a downstream end of the catalyzer 6 through an exhaust passage switch 8. The hydrocarbon adsorbent 7 comprises a substantially cylindrical case 9; a bypass exhaust pipe 10 arranged within the case 9; and a cylindrical adsorbent 11 filled in the middle of the bypass exhaust pipe 10 for adsorbing hydrocarbons contained in exhaust gases which flow into the bypass exhaust pipe 10.

As illustrated in FIG. 2, the case 9 has its upstream end branched into two: an upper opening 9a in communication with a main passage 12 having an annular cross-section, formed between the case 9 and the bypass exhaust pipe 10, and a lower opening 9b in communication with a bypass passage 13 which defines an internal space of the bypass exhaust pipe 10.

The bypass exhaust pipe 10 has its upstream end hermetically connected to the inner wall of the lower opening 9b of the case 9, and its downstream end likewise hermetically connected to the inner wall of a downstream end of the case 9. The bypass exhaust pipe 10 is formed with a plurality (for example, five) of elongated communication holes 10a formed in a downstream end portion at equal intervals from one another in the circumferential direction. The main passage 12 and the bypass passage 13 have their downstream ends communicating with each other through these communication holes 10a.

The adsorbent 11 is comprised of a honeycomb core (not shown), made of a metal, which carries zeolite on its surface, and has the property of adsorbing moisture as well as hydrocarbons, so that as exhaust gases flowing into the bypass passage 13 pass through the interior of the adsorbent 11, hydrocarbons and moisture contained in the exhaust gases are adsorbed by the zeolite. Zeolite, which has high heat resistant properties, adsorbs hydrocarbons in a low temperature state (for example, below 100° C.), and desorbs hydrocarbons once adsorbed thereby when its temperature rises to a predetermined temperature or higher (for example, 100–250° C.). Then, the desorbed hydrocarbons are recirculated to the engine 1 through an EGR pipe 14 and intake pipe 1a from the hydrocarbon adsorber 7, and burnt by the engine 1.

The exhaust passage switch 8 is provided for selectively switching the passage of exhaust gases downstream of the catalyzer 6 to the main passage 12 and to the bypass passage 13 depending on whether the three-way catalysts 5 are activated. The exhaust passage switch 8 has a substantially cylindrical connecting pipe 15; and a switching valve 16 pivotably arranged within the connecting pipe 15. The switching valve 16 is driven by a switching valve driver 17 (see FIG. 1) controlled by an ECU 30, later described, to switch the exhaust passage to the main passage 12 when it is positioned as indicated by solid lines in FIG. 2, and the exhaust passage to the bypass passage 13 when it is positioned as indicated by two-dot chain lines.

As described above, the EGR pipe 14 is coupled between the connecting pipe 15 and intake pipe 1a of the engine 1 for recirculating a portion of exhaust gases to the engine 1. An EGR control valve 18 is disposed at an intermediate location of the EGR pipe 14. The EGR control valve 18 is controlled by the ECU 30 to control activation/stoppage of the EGR as well as an EGR amount.

According to the foregoing configuration, the exhaust passage is switched to the bypass passage 13 by the exhaust passage switch 8 immediately after a cold start of the engine 1, thereby introducing exhaust gasses passing through the catalyzer 6 into the bypass passage 13. After hydrocarbons contained in the exhaust gases have been adsorbed by the adsorbent 11, the exhaust gases are emitted to the atmosphere. Subsequently, upon determining that hydrocarbons have been fully adsorbed by the adsorbent 11, the exhaust passage is switched to the main passage 12, thereby introducing the exhaust gases into the main passage 12 through the connecting pipe 15 to emit the exhaust gases to the atmosphere. Also, as the EGR control valve 18 is opened to operate the EGR, a portion of the exhaust gases is recirculated to the intake pipe 1a through the bypass passage 13 and EGR pipe 14 as an EGR gas. Hydrocarbons desorbed from the adsorbent 11 are sent to the intake pipe 1a by the EGR gas and burnt by the engine 1.

Each of cylinders of the engine 1 is provided with an ignition plug 19 (only one of which is illustrated) which is connected to the ECU 30 through a distributor 20. Each of the ignition plug 19 is applied with a high voltage at a timing in accordance with an ignition timing IGLOG and then shut off to discharge by a driving signal from the ECU 30, thereby igniting an air/fuel mixture in an associated cylinder.

The case 9 of the hydrocarbon adsorber 7 is also provided with a humidity sensor 21 at a location downstream of the adsorbent 11. The humidity sensor 21 has a sensor element 21a (see FIG. 2) comprising a porous body, for example, made of alumina, titania or the like. Taking advantage of the characteristic that its resistance value VRST varies in accordance with the amount of moisture adsorbed into pores of the sensor element 21a, the humidity sensor 21 detects the humidity. The humidity sensor 21 sends a detection signal indicative of the resistance value VRST of the sensor element 21a to the ECU 30. An ambient temperature sensor 22 comprised of a thermistor or a platinum resistor is also disposed near the sensor element 21a for detecting an ambient temperature THCM near the sensor element 21a to send a detection signal indicative of the ambient temperature THCM to the ECU 30. The humidity sensor 21 is also provided with a heater 23 for heating the sensor element 21a. The heater 23 (cleaning execution means, heat cleaning means) is configured to apply a variable amount of heating, and a voltage applied to the heater 23 is controlled to the ECU 30 to control the amount of heating. A proportion type air/fuel ratio sensor (hereinafter called the "LAF sensor") 24 is disposed at a location upstream of the catalyst 6 in the exhaust pipe 4. The LAF sensor 24 linearly detects an oxygen concentration (air/fuel ratio) of exhaust gases to output a detection value VLAF to the ECU 30. The detection value VLAF is set to be lower as the oxygen concentration is lower, i.e., as the air/fuel ratio is richer.

The engine 1 is also provided with an engine water temperature sensor 25 comprised of a thermistor or the like and a crank angle sensor 26, both of which are attached on the body of the engine 1. The engine water temperature sensor 25 detects an engine water temperature TW, which is the temperature of cooling water circulating within a cylinder block of the engine 1, and sends a detection signal indicative of the engine water temperature TW to the ECU 30. The crank angle sensor 26 in turn outputs a CRK signal and a TDC signal, which are both pulse signals, to the ECU 30 every predetermined crank angle as a crank shaft, not shown, of the engine 1 is rotated. An intake pressure sensor 27 is attached on the intake pipe 1a for detecting an absolute pressure within the intake pipe 1a (hereinafter called the "absolute intake pipe inner pressure") PBA to send a detection signal indicative of the absolute intake pipe inner pressure PBA to the ECU 30. An alarm lamp 28 and an atmospheric temperature sensor 29 are also connected to the ECU 30. The alarm lamp 28 is turned on when the adsorbent 11 is determined to be deteriorated. The atmospheric temperature sensor 29 detects an atmospheric temperature TA, as a temperature external to the engine 1 and exhaust system 2, and sends a detection signal indicative of the atmospheric temperature TA to the ECU 30.

In this embodiment, the ECU 30 comprises cleaning completion determining means, adsorbent state determining means, and adsorbent deterioration determining means. The ECU 30 may be based on a microcomputer which is comprised of an I/O interface, a CPU, a RAM, a ROM, and the like. Respective signals detected by the aforementioned sensors such as the humidity sensor 21 are inputted to the CPU after subjected to A/D conversion, waveform reshaping and the like in the I/O interface.

The CPU determines an operating condition of the engine 1 based on engine parameter signals detected by a variety of sensors mentioned above, calculates a fuel injection time Tout and an ignition timing IGLOG in accordance with the result of determination in synchronism with the generation of a TDC signal, and outputs a driving signal based on the result of calculation to an injector 19 and a distributor 20. The CPU also controls the switching valve driver 17 and EGR control valve 18 in response to detection signals from a variety of sensors in accordance with a control program, tables and the like stored in the ROM, executes a heat cleaning (hereinafter sometimes called "HC") control, and determines the state, more specifically, a deterioration of the adsorbent 11.

Figure 3:
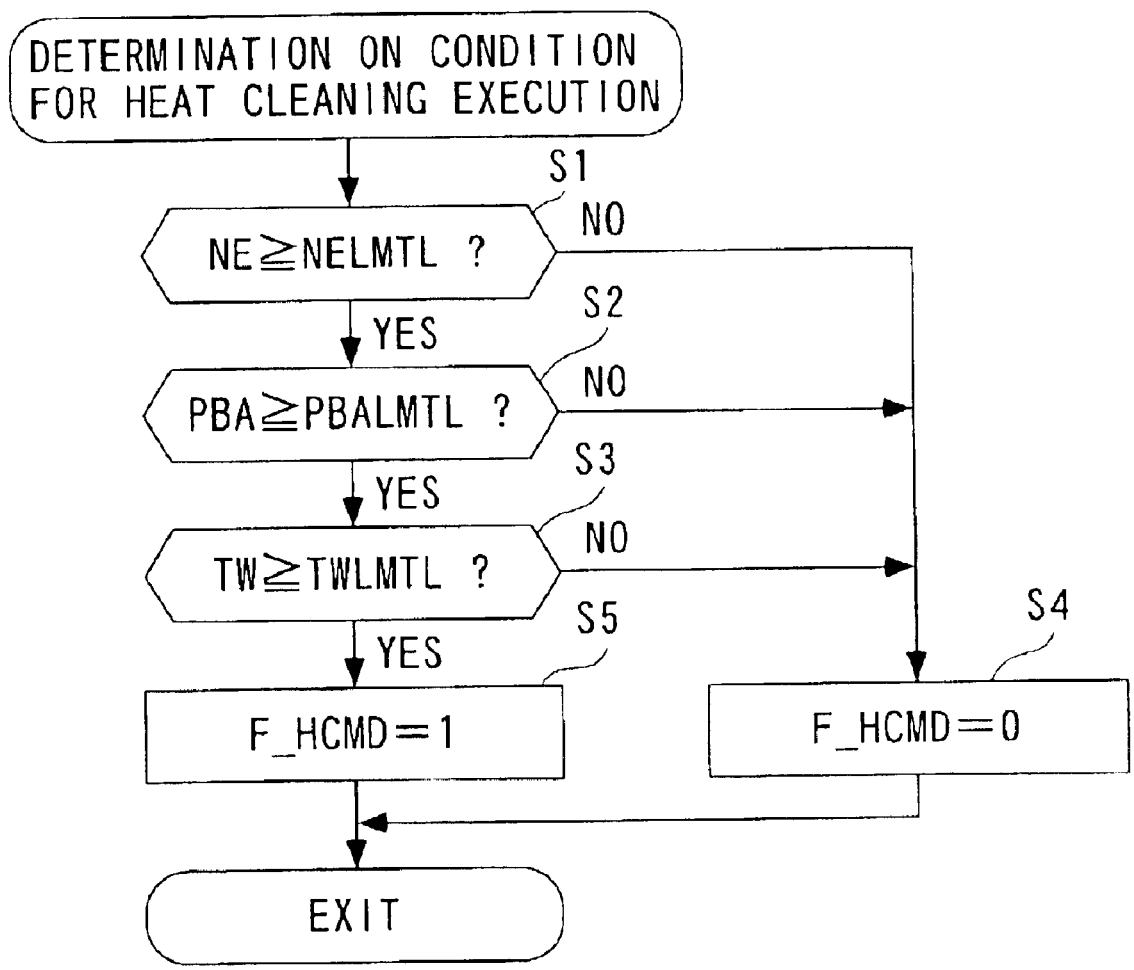
FIG. 3 is a flow chart illustrating a routine for determining an execution condition for heat cleaning.

FIG. 3 is a flow chart illustrating a heat cleaning execution determination routine for determining whether or not the heat cleaning control should be executed. This routine and control routines later described are executed every predetermined time (for example, every 100 ms). First, at steps 1–3 (labeled as "S1"–"S3" in the figure. The same is applied to the following description), it is determined whether or not the engine rotational speed NE is equal to or higher than its predetermined lower limit value NELMTL (for example, 650 rpm), whether or not the absolute intake pipe inner pressure PBA is equal to or higher than its predetermined lower limit value PBALMTL (for example, 150 mmHg), and whether or not the engine water temperature TW is equal to or higher than its predetermined lower limit value TWLMTL (for example, 80° C.). If the answer to any of these steps is NO, the ECU 30 sets a HC control execution condition establishment flag to "0" on the assumption that the condition for executing the heat cleaning control is not established (step 4). On the other hand, if the answers at these steps 1–3 are all YES, i.e., when the engine rotational speed NE, absolute intake pipe inner pressure PBA, and engine water temperature TW are within respective predetermined ranges, the ECU 30 sets the HC control execution condition establishment flag to "1" on the assumption that the condition for executing the heat cleaning control is established (step 5), followed by termination of the heat cleaning execution determination routine.

Figure 4:
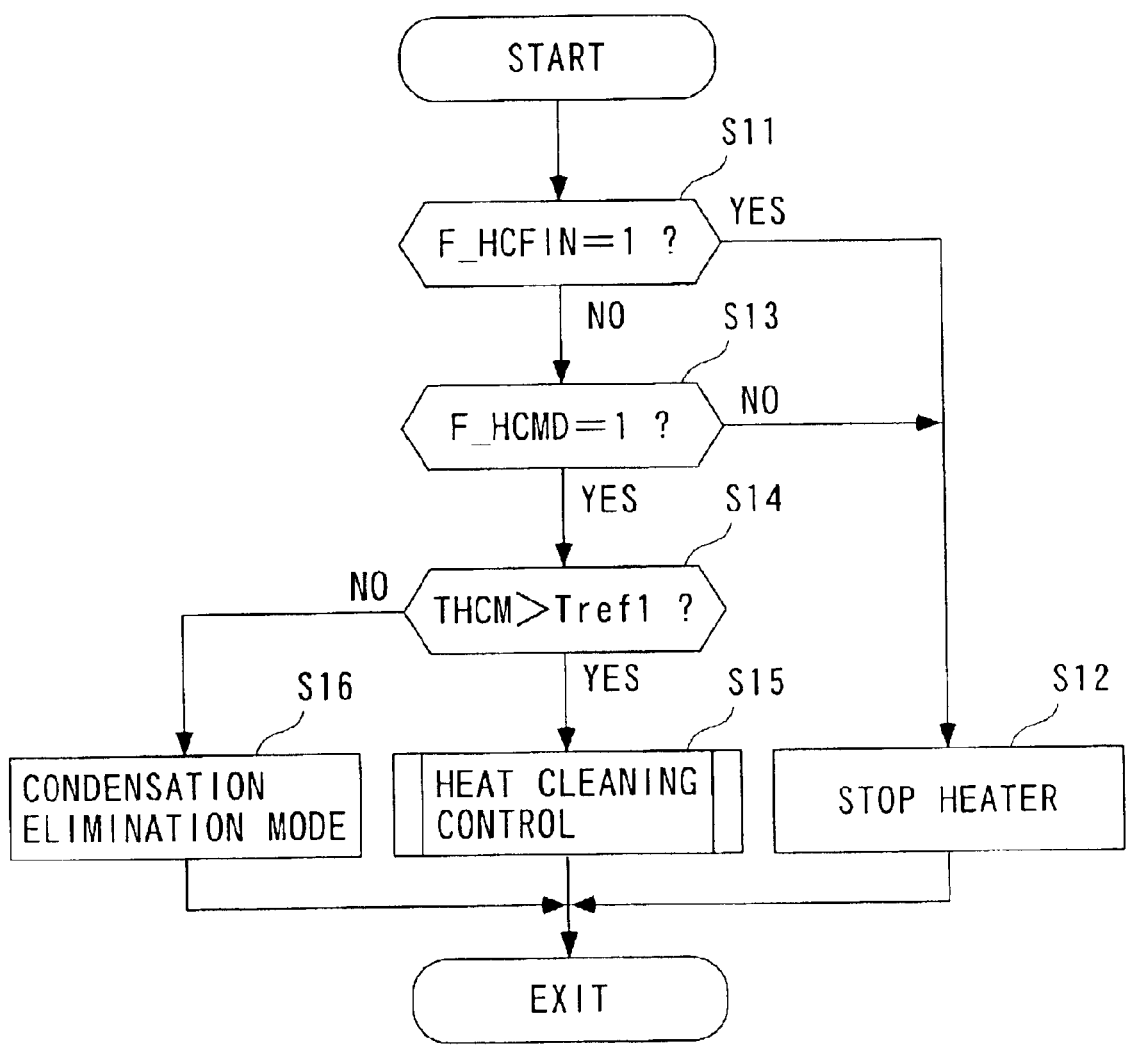
FIG. 4 is a flow chart illustrating a routine for controlling a heater.

FIG. 4 is a flow chart illustrating a heater control routine. It is first determined at step 11 whether or not a HC control completion flag F_HCFIN is "1." When F_HCFIN=1, i.e., when the heat cleaning is completed, the ECU 30 stops supplying the electric power to the heater 23 (step 12). If the answer to step 11 is NO, it is determined whether or not the HC control execution condition establishment flag F_HCMD is "1" (step 13). If the answer to step 13 is NO, i.e., when no condition is established for executing the heat cleaning control, the routine returns to step 12, where the ECU 30 stops the heater 23, followed by termination of the heater control routine. If the answer to step 13 is YES, it is determined whether or not the ambient temperature THCM is higher than a first predetermined temperature Tref1 (step 14). The first predetermined temperature Tref1 is set at a temperature at which the sensor element 21a is free from condensation (for example, 70° C.). If the answer to step 14 is YES, i.e., when the ambient temperature THCM is higher than the first predetermined temperature Tref1, the ECU 30 executes the heat cleaning control, later described, followed by termination of the heater control routine (step 15). If the answer to step 14 is NO, i.e., when the ambient temperature THCM is equal to or lower than the first predetermined temperature Tref1, the ECU 30 determines that the sensor element 21a is likely to suffer from condensation, and operates the heater 23 in a condensation elimination mode for eliminating the condensation (step 16). In the condensation elimination mode, the heater 23 is driven with a smaller heating amount than in the heat cleaning control.

Figure 5:
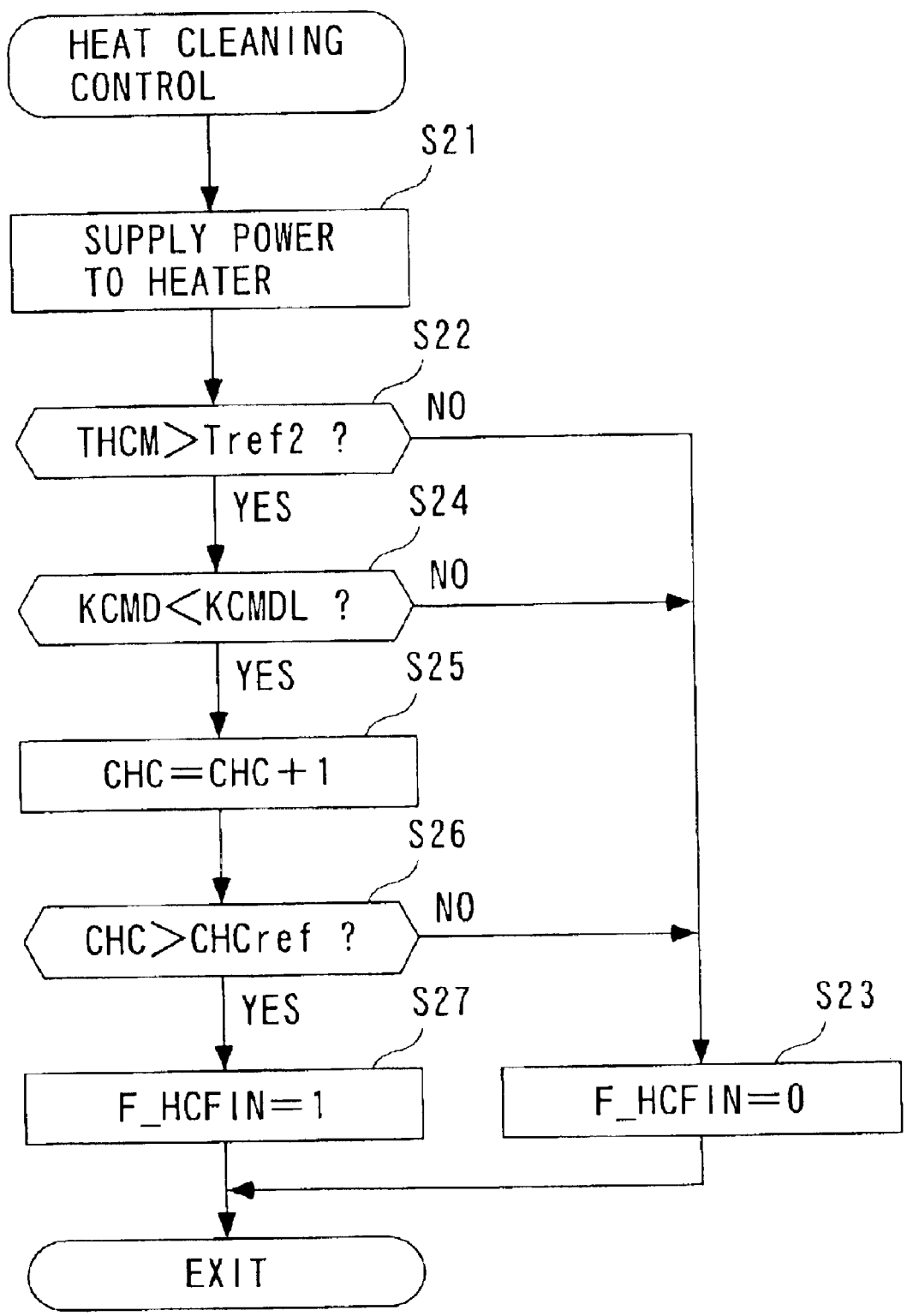
FIG. 5 is a flow chart illustrating a routine for controlling the heat cleaning.

FIG. 5 is a flow chart illustrating the heat cleaning control routine executed at step 15 in FIG. 4. First, at step 21, the heater 23 is supplied with the power to heat the sensor element 21a. Next, it is determined whether or not the ambient temperature THCM is higher than a second predetermined temperature Tref2 which is higher than the first predetermined temperature Tref1 (step 22). The second predetermined temperature Tref2 is set at a temperature above which impurities sticking on the sensor element 21a can be burnt for removal by the heater 23 (for example, 300° C.).

If the answer to step 22 is NO, i.e., when the ambient temperature THCM is equal to or lower than the second predetermined temperature Tref2, the routine proceeds to step 23, where the ECU 30 sets the HC control completion flag F_HCFIN to "0" and continues the heat cleaning control.

If the answer to step 22 is YES, i.e., when the ambient temperature THCM is higher than the second predetermined temperature Tref2, the routine proceeds to step 24, where it is determined whether or not a target air/fuel ratio coefficient KCMD is smaller than a predetermined value KCMDL (for example, 1.0). The target air/fuel ratio coefficient KCMD is set by the ECU 30 in accordance with the engine rotational speed NE, absolute intake pipe inner pressure PBA and the like, and is multiplied when the ECU 30 calculates the fuel injection time for the engine 1. Specifically, the target air/fuel ratio coefficient KCMD is set at 1.0 when the target air/fuel ratio is at the stoichiometric air/fuel ratio, at a value larger than 1.0 when the target air/fuel ratio is richer than the stoichiometric air/fuel ratio, and at a value smaller than 1.0 when the target air/fuel ratio is leaner than the stoichiometric air/fuel ratio.

If the answer to step 24 is NO, i.e., when KCMD≧KCMDL, in other words, when an air/fuel mixture supplied to the engine 1 is controlled to be at the stoichiometric air/fuel ratio or richer than the same, and the humidity sensor 21 is not in an oxidizing atmosphere, the routine proceeds to step 23, where the ECU 30 sets the HC control completion flag F_HCFIN to "0" and continues the heat cleaning control.

If the answer to step 24 is YES, i.e., when KCMD<KCMDL, in other words, when the air/fuel ratio of the air/fuel mixture is controlled to be leaner than the stoichiometric air/fuel ratio, including a fuel cut state, and the humidity sensor 21 is in an oxidizing atmosphere, the routine proceeds to step 25, where the ECU 30 increments a counter CHC. Then, the routine proceeds to step 26, where it is determined whether or not a count value on the counter CHC is larger than a predetermined value CHCref (for example, corresponding to ten seconds). If the answer to step 26 is NO, i.e., when CHC≦CHCref, the ECU 30 executes the aforementioned step 23 and continues the heat cleaning control.

If the answer to step 26 is YES, i.e., when the ambient temperature THCM is higher than the second predetermined temperature Tref2, and the heater 23 is operating for a predetermined time corresponding to the predetermined value CHCref while the humidity sensor 21 is in the oxidizing atmosphere, the ECU 30 sets the CH control completion flag F_HCFIN to "1" for indicating that the heat cleaning control is completed, on the assumption that impurities sticking on the sensor element 21a have been sufficiently burnt or removed by the heat cleaning control (step 27), followed by termination of the heat cleaning control routine. Consequently, the answer to step 11 in FIG. 4 is YES, causing the ECU 30 to subsequently stop supplying the power to the heater 23.

Figure 6:
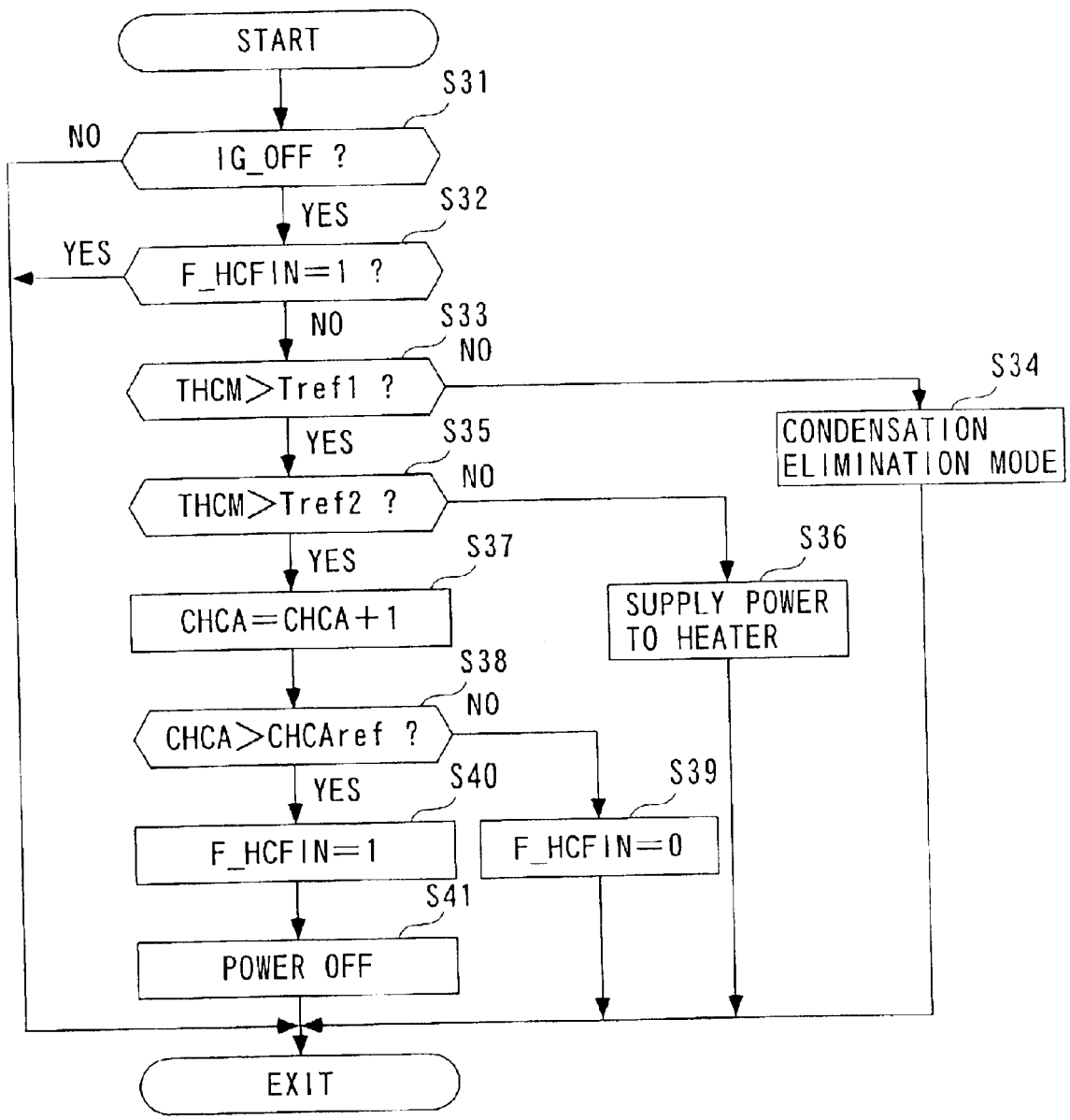
FIG. 6 is a flow chart illustrating a routine for controlling the heater when the internal combustion engine is stopped.

FIG. 6 is a flow chart illustrating a routine for controlling the heater 23, executed after the engine 1 is stopped. First, it is determined at step 31 whether or not the ignition switch of the engine 1 is OFF. If the answer to step 31 is NO, i.e., when the engine 1 is operating, the heater control routine is terminated. On the other hand, if the answer to step 31 is YES, i.e., when the engine 1 is stopped, it is determined whether or not the HC control completion flag F_HCFIN is "1" (step 32). If the answer to step 32 is YES, i.e., when the heat cleaning control has been completed, the heater control routine is terminated.

If the answer to step 32 is NO, i.e., when the heat cleaning control is not completed at the time the engine 1 is stopped, the ECU 30 conducts a control similar to the aforementioned heater control during an operation of the engine 1 at step 33 onward. First, at step 33, it is determined whether or not the ambient temperature THCM is higher than the first predetermined temperature Tref1. If the answer to step 33 is NO, i.e., when THCM≦Tref1, the routine proceeds to step 34, where the heater 23 is operated with a smaller heating amount in the condensation elimination mode, in a manner similar to the aforementioned step 16 in FIG. 4, followed by termination of the heater control routine.

If the answer to step 33 is YES, it is determined whether or not THCM>Tref2, as is the case with the aforementioned step 22 in FIG. 5 (step 35). If the answer to step 35 is NO, i.e., when the sensor element temperature THCM is equal to or lower than the second predetermined temperature Tref2, the heater 23 is operated (step 36), followed by termination of the heater control routine.

If the answer to step 35 is YES, i.e., when THCM>Tref2, the ECU 30 increments a counter CHCA (step 37), and determines whether or not a count value on the counter CHCA is larger than a value CHCAref (for example, corresponding to ten seconds) (step 38). If the answer to step 38 is NO, i.e., when CHCA≦CHCAref, the routine proceeds to step 39, where the ECU 30 sets the HC control completion flag F_HCFIN to "0" and continues the heat cleaning control.

If the answer to step 38 is YES, i.e., when CHCA>CHCAref, the ECU 30 sets the HC control completion flag F_HCFIN to "1" (step 40) on the assumption that the heat cleaning control is completed after the stop and, powers off the heater 23 and ECU 30 (step 41), followed by termination of the heater control routine.

Figure 7:
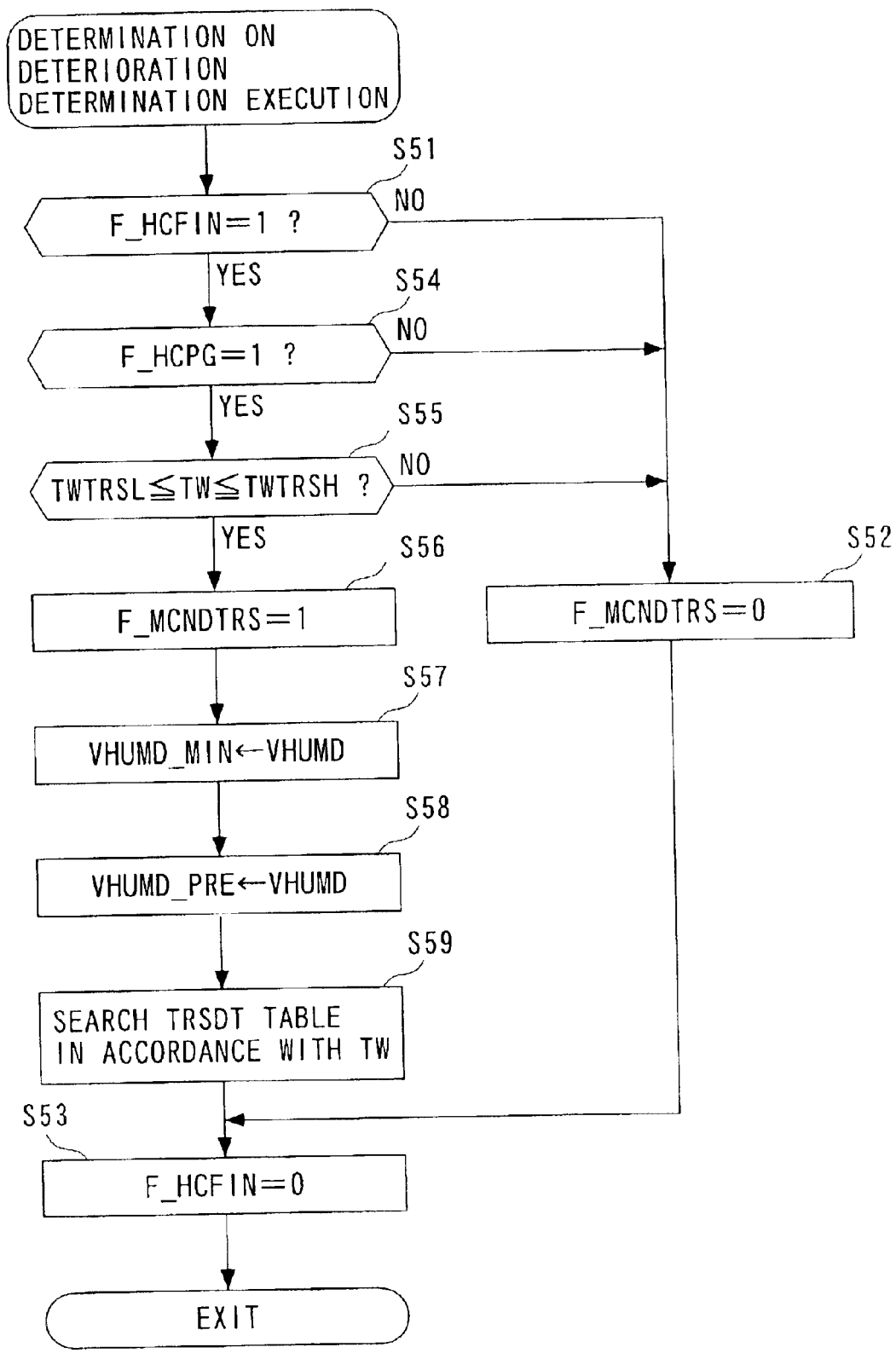
FIG. 7 is a flow chart illustrating a routine for determining execution of a deterioration determination for the adsorbent.

Next, the processing for determining a deterioration of the adsorbent 11 will be described with reference to FIGS. 7 to 14. FIG. 7 illustrates a routine for determining whether or not the deterioration determination is executed for the adsorbent 11 upon start of the engine 1. This routine is executed only once immediately after the engine 1 is started.

First, in the execution determination routine, it is determined at step 51 whether or not the HC control completion flag F_HCFIN is "1." If the answer to step 51 is NO, i.e., when the heat cleaning control is not completed during the preceding operation of the engine 1 or at the time the engine 1 is subsequently stopped, the ECU 30 sets a deterioration determination enable flag F_MCNDTRS to "0" (step 52), on the assumption that the condition for executing the deterioration determination for the adsorbent 11 is not established because impurities sticking on the sensor element 21a could prevent the ECU 30 from properly determining a deterioration of the adsorbent 11. Next, the ECU 30 resets the HC control completion flag F_HCFIN to "0" (step 53), followed by termination of the execution determination routine.

If the answer to step 51 is YES, i.e., when F_HCFIN=1, in other words, when the heat cleaning control is completed during the preceding operation of the engine 1 or when the engine 1 is subsequently stopped, it is determined whether or not a desorption completion flag F_HCPG is "1" (step 54). The desorption completion flag F_HCPG is set to "1" when it is determined that hydrocarbons have been fully desorbed from the adsorbent 11. If the answer to step 54 is NO, i.e., when hydrocarbons are not fully desorbed during the preceding operation, the ECU 30 sets the deterioration determination enable flag F_MCNDTRS to "0" (step 52), on the assumption that the condition for executing the deterioration determination for the adsorbent 11 is not established, because hydrocarbons remaining in the adsorbent 11 could prevent the ECU 30 from properly determining a deterioration of the adsorbent 11. Next, the ECU 30 executes the aforementioned step 53, followed by termination of the execution determination routine.

If the answer to step 54 is YES, i.e., when hydrocarbons have been fully desorbed during the preceding operation, the routine proceeds to step 55, where it is determined whether or not the engine water temperature TW is equal to or higher than its lower limit value TWTRSL (for example, 0° C.) and equal to or lower than its upper limit value TWTRSH (for example, 50° C.). If the answer to step 55 is NO, i.e., when the engine water temperature TW upon starting is out of a predetermined range defined by the upper and lower limit values TWTRSL, TWTRSH, the ECU 30 sets the deterioration determination enable flag F_MCNDTR to "0" (step 52) on the assumption that the condition for executing the deterioration determination for the adsorbent 11 is not established, as is the case with the aforementioned heat cleaning control or the desorption not completed. Next, the ECU 30 executes the aforementioned step 53, followed by termination of the execution determination routine.

On the other hand, if the answer to step 55 is YES, i.e., when the engine water temperature TW falls within the predetermined range, the ECU 30 sets the deterioration determination enable flag F_MCNDTRS to "1" (step 56) on the assumption that the condition for executing the deterioration determination is established. Next, the ECU 30 sets the relative humidity VHUMD detected by the humidity sensor 21 at that time as initial values for a minimum value VHUMD_MIN and previous value VHUMD_PRE of the relative humidity VHUMD, respectively (steps 57, 58). The relative humidity VHUMD is calculated from a table shown in FIG. 8 in accordance with the sensor resistance value VRST detected by the humidity sensor 21 and the ambient temperature THCM.

Figure 8:
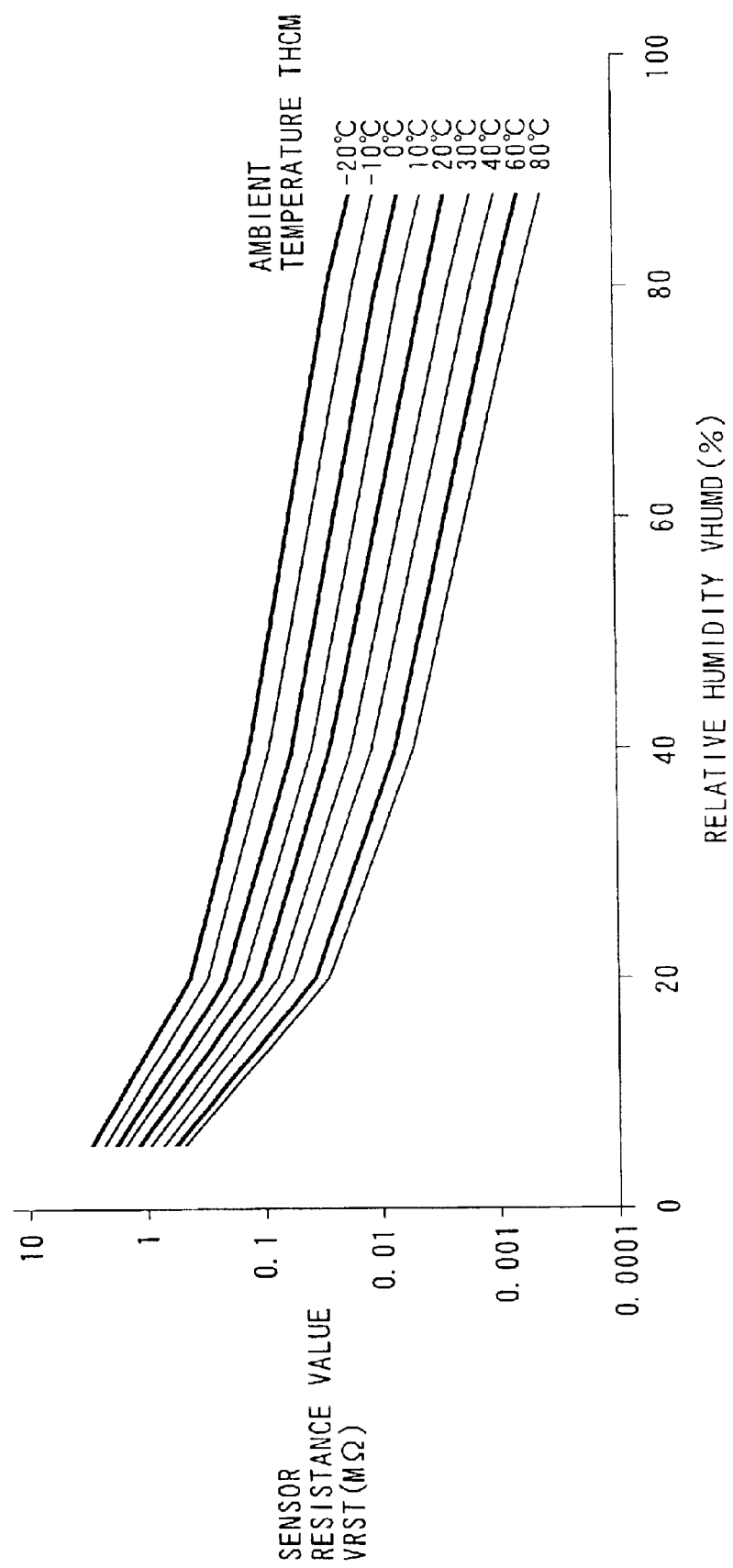
FIG. 8 is a table for calculating a relative humidity VHUMD in accordance with an ambient temperature THCM and a sensor resistance value VRST.

The table shown in FIG. 8 is made up of nine tables corresponding to the ambient temperature THCM, and each table is set in such a manner that the relative humidity VHUMD is lower as the sensor resistance value VRST is higher. Also, among tables, the relative humidity VHUMD is set higher as the ambient temperature THCM is lower. One table corresponding to the ambient temperature THCM detected by the ambient temperature sensor 22 is selected from among these tables, and a table corresponding to the sensor resistance value VRST detected by the humidity sensor 21 is searched to calculate the relative humidity VHUMD. When the ambient temperature THCM presents a value between tables, the relative humidity VHUMD is calculated by an interpolation. By finding the relative humidity VHUMD in this manner, the relative humidity VHUMD can be appropriately calculated for exhaust gases which are compensated for the temperature.

Figure 9:
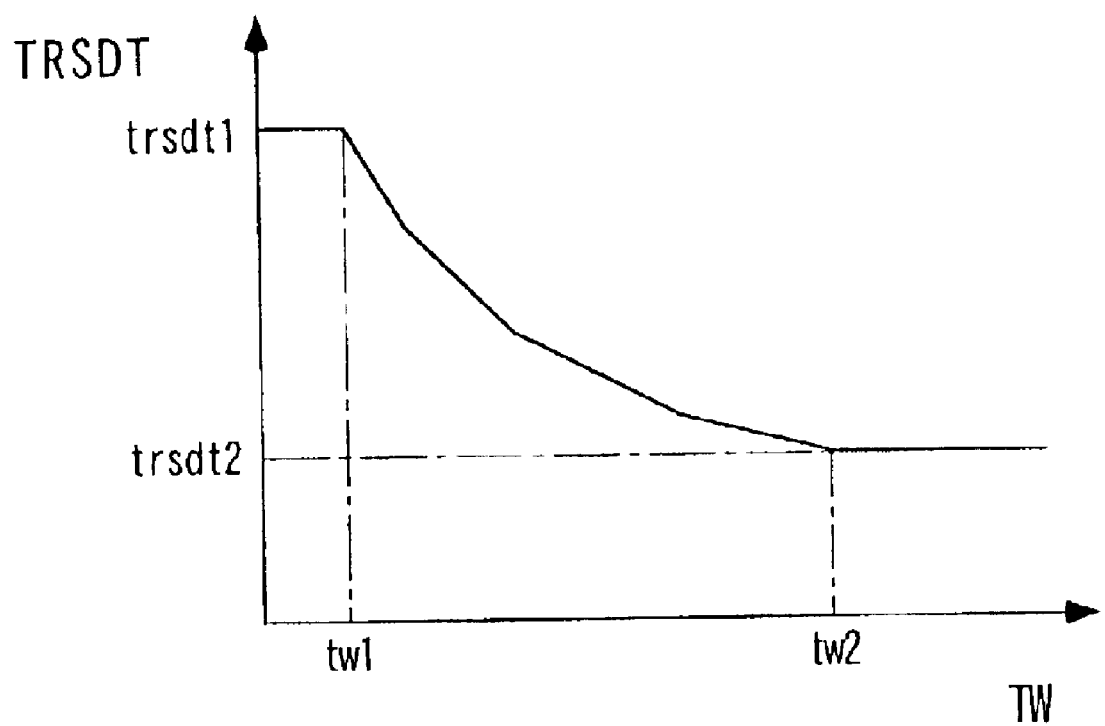
FIG. 9 is a deterioration determination threshold table showing the relationship between an engine water temperature TW upon start of the engine and a deterioration determination threshold TRSDT of the adsorbent.

Next, the routine proceeds to step 59, where the ECU 30 searches a deterioration determination threshold table (hereinafter referred to as the "TRSDT table") for the adsorbent 11 shown in FIG. 9 in accordance with the engine water temperature TW to calculate a deterioration determination threshold TRSDT for determining a deterioration of the adsorbent 11, later described. As shown in FIG. 9, in the TRSDT table, the deterioration determination threshold TRSDT is set at a first predetermined value trsdt1 when the engine water temperature TW is below a first predetermined temperature tw1 (for example, 0° C.), and at a second predetermined value trsdt2 (trsdt1>trsdt2) when the engine water temperature TW exceeds a second predetermined temperature tw2 (for example, 40° C.) higher than the first predetermined temperature tw1. Also, when the engine water temperature TW is between the two predetermined temperatures tw1, tw2 (tw1≦TW≦tw2), the deterioration determination threshold TRSDT is set at a larger value as the engine water temperature TW is lower.

After executing step 59, the ECU 30 executes the aforementioned step 53, followed by termination of the execution determination routine. Since the HC control completion flag F_HCFIN is reset to "0" without fail upon termination of the execution determination routine as described above, the deterioration determination is enabled each time the engine 1 is started only when the heat cleaning has been completed during the preceding operation or after the engine 1 is stopped.

Figure 10:
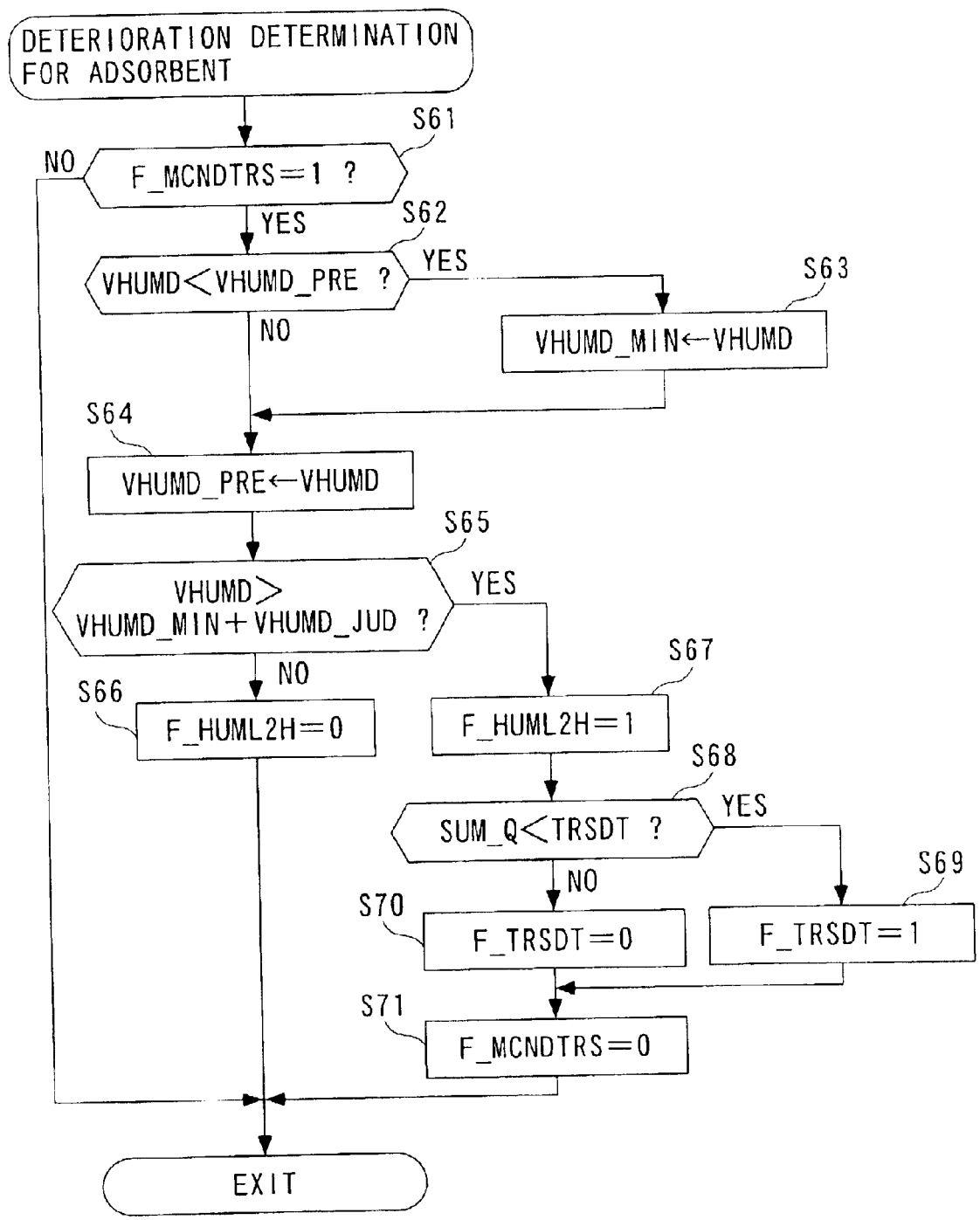
FIG. 10 is a flow chart illustrating a routine for determining a deterioration of the adsorbent.

FIG. 10 illustrates a routine for determining the deterioration of the adsorbent 11, executed in accordance with the result of determination made by the execution determination routine in the aforementioned FIG. 7. This adsorbent deterioration determination routine is executed in synchronism with the generation of a TDC signal. First, it is determined whether or not the deterioration determination enable flag F_MCNDTRS is "1" (step 61). If the answer to step 61 is NO, showing a failure in establishment of the condition for determining the deterioration of the adsorbent 11, the adsorbent deterioration determination routine is terminated without further processing.

On the other hand, if the answer to step 61 is YES, showing successful establishment of the condition for determining the deterioration of the adsorbent 11, it is determined whether or not the relative humidity VHUMD calculated from a current detection value provided by the humidity sensor 21 is smaller than the preceding value VHUMD_PRE (step 62). If the answer to step 62 is YES, i.e., when VHUMD<VHUMD_PRE, the relative humidity VHUMD at that time is set as a minimum value VHUMD_MIN (step 63). In this manner, the minimum value VHUMD_MIN is updated at all times when the relative humidity VHUMD is lower than the preceding value thereof, so that the minimum value VHUMD_MIN indicates a minimum value immediately before the relative humidity VHUMD begins rising (see time t0 in FIG. 14). If the answer to step 62 is NO, or after executing step 63, the routine proceeds to step 64, where the current relative humidity VHUMD is shifted to the preceding value VHUMD_PRE.

Next, it is determined whether or not the relative humidity VHUMD is larger than the sum of the minimum value VHUMD_MIN and a predetermined rising determination value VHUMD_JUD (for example, 10%) (step 65). If the answer to step 65 is NO, the ECU 30 sets a rising establishment flag F_HUML2H to "0" (step 66), on the assumption that the relative humidity VHUMD has not sufficiently risen, followed by termination of the adsorbent deterioration determination routine.

On the other hand, if the answer to step 65 is YES, showing that VHUMD>VHUMD_MIN+VHUMD_JUD is established, i.e., when the relative humidity VHUMD rises from the minimum value VHUMD_MIN beyond the rising determination value VHUMD_JUD (at time t1 in FIG. 14), the ECU 30 sets the rising establishment flag F_HUML2H to "1" (step 67) on the assumption that the relative humidity VHUMD has sufficiently risen and is now stably rising.

Next, the routine proceeds to step 68, where it is determined whether or not an accumulated calory value SUM_Q is smaller than the deterioration determination threshold TRSDT calculated at the aforementioned step 59 in FIG. 7. This accumulated calory value SUM_Q indicates an accumulated value of calory supplied to the exhaust system 2 after the engine 1 was started, and is calculated in the following manner.

Figure 11:
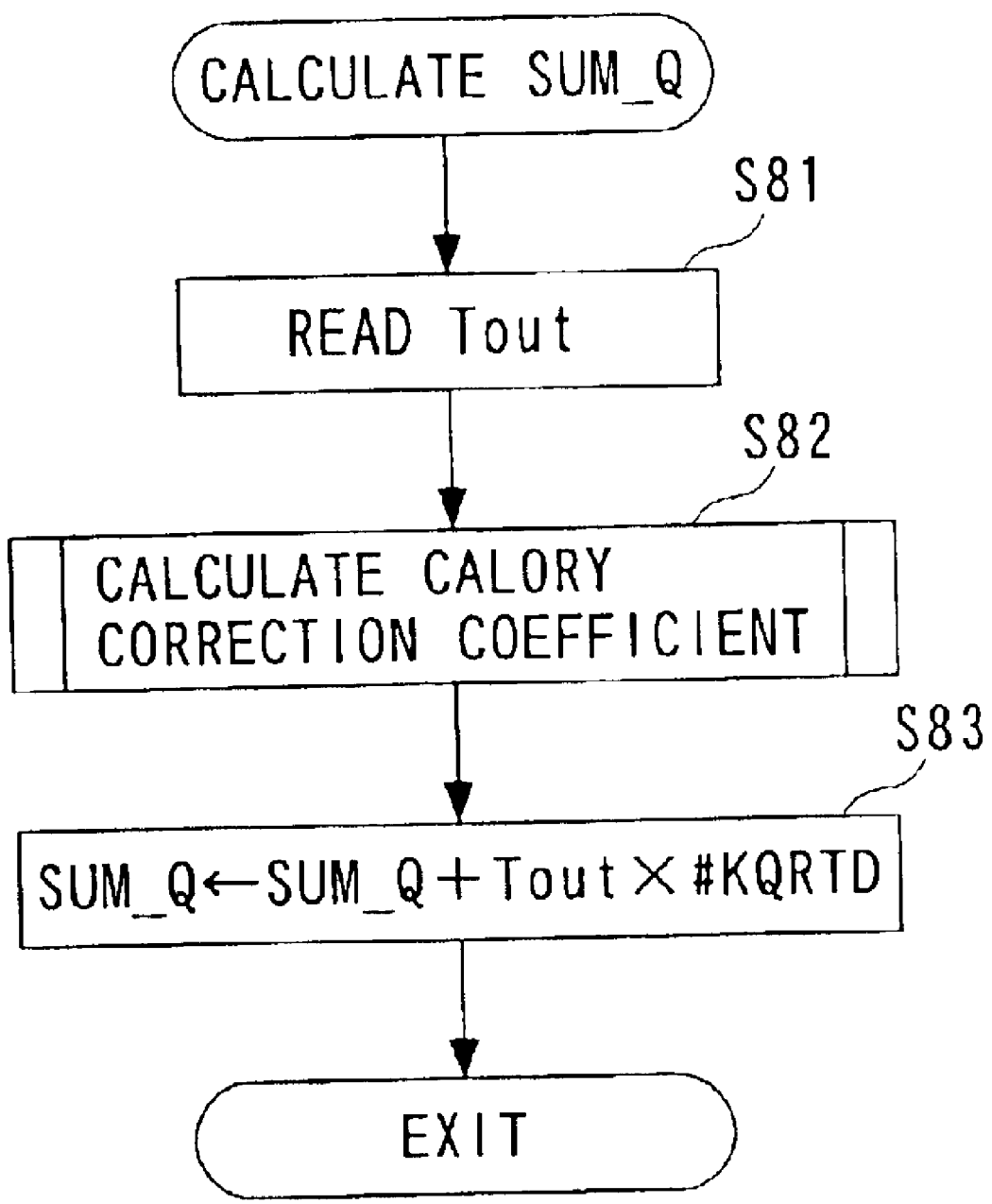
FIG. 11 is a flow chart illustrating a routine for calculating an accumulated calory value SUM_Q given to an exhaust system.

FIG. 11 illustrates a routine for calculating the accumulated calory value SUM_Q. This SUM_Q calculation routine is executed in synchronism with the generation of a TDC signal. It should be noted that the accumulated calory value SUM_Q is reset to zero when an ignition switch is turned ON upon starting the engine 1.

Figure 12:
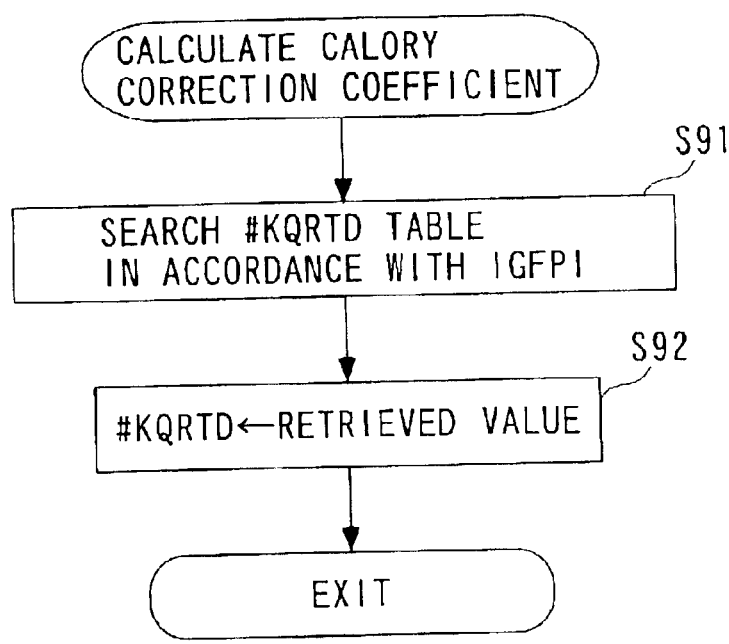
FIG. 12 is a flow chart illustrating a routine for calculating a calory correction coefficient #KQRTD.
Figure 13:
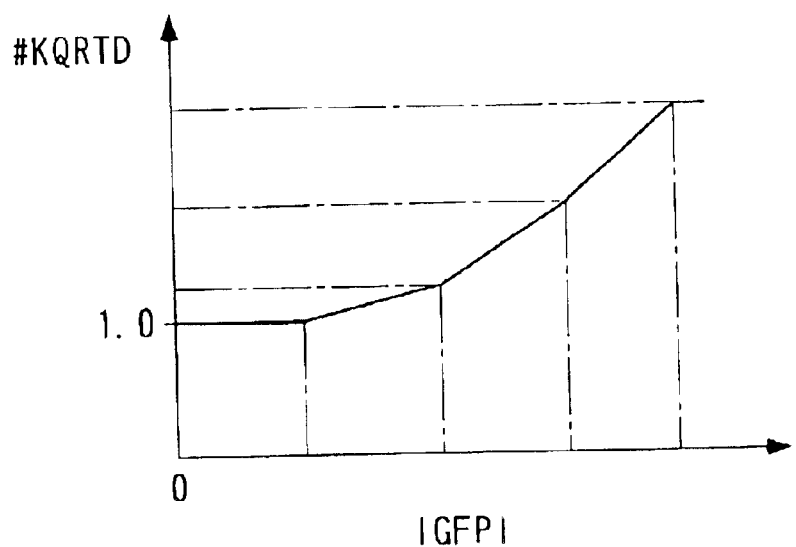
FIG. 13 is a table showing the relationship between a rapid warm-up retard amount IGFPI of ignition timing and a calory correction term #KQRTD.
Figure 14:
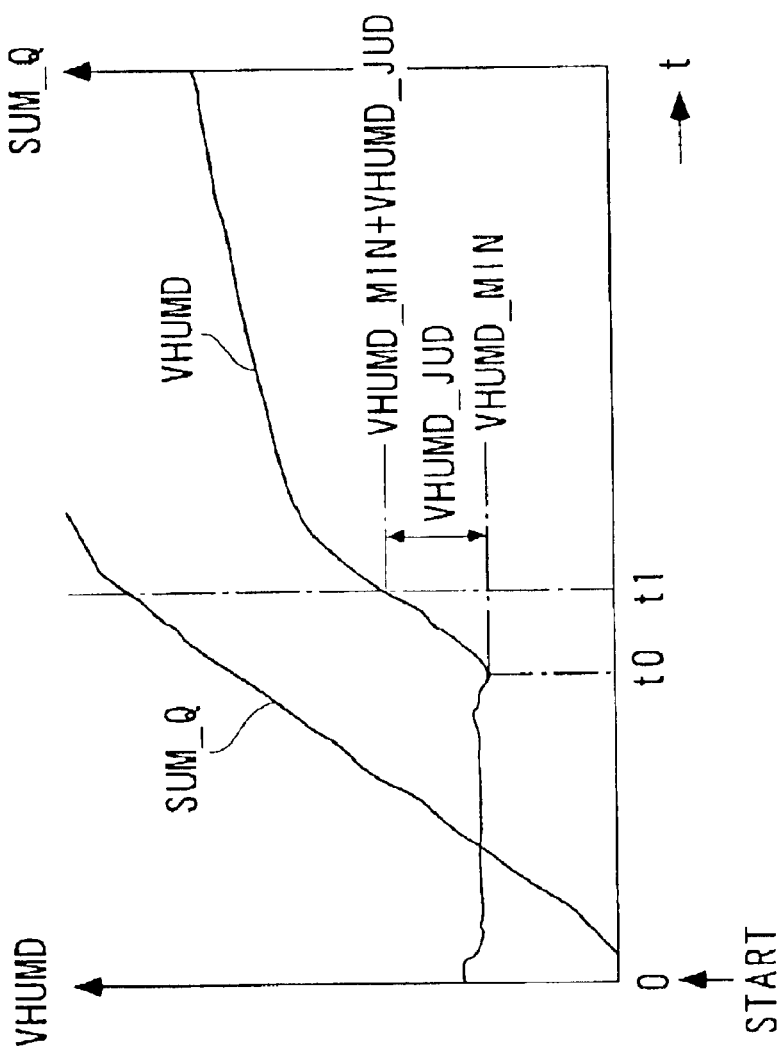
FIG. 14 is a time chart showing exemplary transitions of the relative humidity VHUMD detected by the humidity sensor and the accumulated calory value SUM_Q from the start of the engine.

First, in this routine, the ECU 30 reads a fuel injection time Tout of an injector 1b for each cylinder (step 81), and calculates a calory correction coefficient #KQRTD (step 82). As illustrated in FIG. 12, in a routine for calculating the calory correction coefficient #KQRTD at step 82, the ECU 30 searches a table shown in FIG. 13 as one example, in accordance with a rapid warm-up retard amount IGFPI of the ignition time (step 91), and sets a retrieved value as the calory correction coefficient #KQRTD (step 92). The rapid warm-up retard amount IGFPI is set at a value larger than zero, for conducting the rapid warm-up control in order to activate the three-way catalysts 5 when the engine 1 is started, and subtracted from a basic ignition time. As shown in FIG. 13, the calory correction coefficient #KQRTD is set at the value 1.0 when the rapid warm-up retard amount IGFPI is zero, i.e., when the rapid warm-up control is not executed, and is set at a larger value as the rapid warm-up retard amount IGFPI is larger for four grid points of the rapid warm-up retard amount IGFPI. This is because the calory generated in each cylinder is radiated to the exhaust system 2 in a larger proportion as the rapid warm-up retard amount IGFPI is larger to increase the temperature of exhaust gases.

Next, turning back to FIG. 11, at step 83 next to step 82, the product of the fuel injection time Tout read at step 81 and the calory correction coefficient #KQRTD calculated at step 82 is added to the preceding value of the accumulated calory value SUM Q, and the resulting value is set as the current accumulated calory value SUM_Q.

The accumulated calory value SUM_Q calculated in this manner represents the calory supplied by the engine 1 to the exhaust system 2 from the start. Therefore, as the accumulated calory value SUM_Q is larger, this shows that larger calory is supplied to the adsorbent 11. On the other hand, the adsorbent 11 tends to exhibit a higher adsorbing ability when its temperature is lower, and experience a degraded adsorbing ability as the temperature rises. When the temperature has risen to some extent, the relative humidity VHUMD rises up. Therefore, if the answer to step 68 in FIG. 10 is YES, i.e., when SUM_Q<TRSDT, it is determined that the adsorbent 11 has been deteriorated on the assumption that the relative humidity VHUND has risen earlier, although the adsorbent 11 has not been supplied with sufficient calory for rising the relative humidity VHUMD, and the ECU 30 sets a deterioration flag F_TRSDT to "1" (step 69) for showing this determination.

On the other hand, if the answer to step 68 is NO, i.e., when SUM_Q≧TRSDT, the ECU 30 determines that the adsorbent 11 is not deteriorated on the assumption that the relative humidity VHUMD rises for the first time after the adsorbent 11 is supplied with sufficient calory, and sets the deterioration flag F_TRSDT to "0" (step 70).

At step 71 subsequent to step 69 or 70, the ECU 30 sets the deterioration determination enable flag F_MCNDTRS to "0" in response to the termination of the deterioration determination for the adsorbent 11, followed by termination of the adsorbent deterioration determination routine.

As described above in detail, according to the foregoing embodiment, the deterioration determination is executed for the adsorbent 11 in accordance with the humidity of exhaust gases detected by the humidity sensor 21 under condition that the heat cleaning control has been completed for heating the sensor element 21a by the heater 23. Thus, the deterioration determination can be executed using the humidity of exhaust gases which is detected without impurities sticking on the sensor element 21a, thereby making it possible to accurately determine a deterioration of the adsorbent 11 while ensuring elimination of the influence of the impurities.

Figure 15:
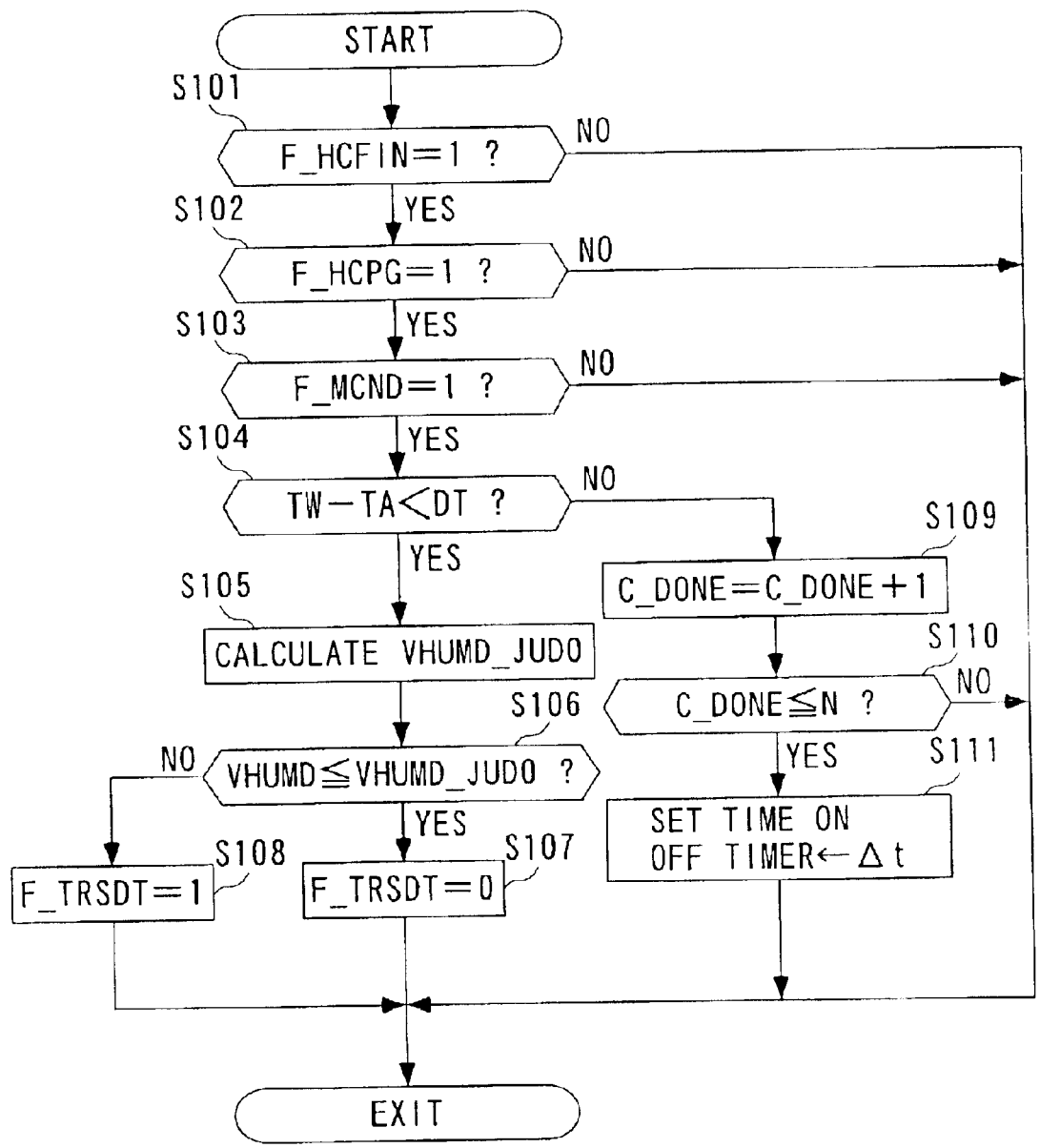
FIG. 15 is a flow chart illustrating a routine for determining a deterioration of the adsorbent after the engine is stopped.

FIG. 15 illustrates a routine for determining a deterioration of the adsorbent 11 after the engine 1 is stopped. This deterioration determination is based on the following concept. After the engine 1 is stopped, the adsorbent 11 adsorbs moisture as the adsorbent 11 is gradually cooled down. As the humidity is progressively adsorbed by the adsorbent 11, the humidity near the adsorbent 11 becomes substantially constant. The constant humidity reflects the degree to which the adsorbent 11 is deteriorated. Specifically, the adsorbent 11 has a lower moisture adsorbing ability as the degree of deterioration is higher, so that its value tends to indicate a larger value than the value indicated by the normal adsorbent 11. Thus, the deterioration determination can be made by detecting the constant humidity by the humidity sensor 21. Also, since the constant humidity is detected for use in the deterioration determination, the humidity sensor 21 for use in this case can be inexpensive one which is relative low in responsibility.

Specifically, the deterioration determination routine is executed when the ECU 30 is re-started by an off timer, not shown, in a predetermined time (for example, two hours) after the engine 1 is stopped, to determine a deterioration of the adsorbent 11 based on the relative humidity VHUMD detected by the humidity sensor 21. First, at step 101, it is determined whether or not the HC control completion flag F_HCFIN is "1." If the answer to step 101 is NO, i.e., when the heat cleaning control is not completed during the preceding operation of the engine 1 or at the time the engine 1 is subsequently stopped, the deterioration determination is not executed because impurities sticking on the sensor element 21a could prevent the ECU 30 from properly determining a deterioration of the adsorbent 11, so that the deterioration determination routine is terminated without further processing.

If the answer to step 101 is YES, i.e., when the heat cleaning control is completed during the preceding operation of the engine 1 or at the time the engine 1 is subsequently stopped, it is determined whether or not the desorption completion flag F_HCPG is "1" (step 102). If the answer to step 102 is NO, i.e., when hydrocarbons are not fully desorbed during the preceding operation, the deterioration determination routine is terminated because hydrocarbons remaining in the adsorbent 11 could prevent the ECU 30 from properly determining a deterioration of the adsorbent 11.

If the answer to step 102 is YES, i.e., when hydrocarbons have been fully desorbed during the preceding operation, it is determined whether or not the deterioration determination enable flag F_MCND is "1" (step 103). The deterioration determination enable flag F_MCND is set to "1" for indicating that the deterioration determination can be properly performed for the adsorbent 11 when the engine water temperature TW is higher than a predetermined value (for example, 85° C.) during an operation of the engine 1, i.e., the adsorbent 11 has been heated to a temperature at which hydrocarbons adsorbed thereby can be desorbed, and a target air/fuel ratio coefficient KCMD falls within a predetermined range near the stoichiometric air/fuel ratio for a predetermined time or more. Therefore, when the answer to step 103 is NO, showing that F_MCND=0, the deterioration determination routine is terminated.

If the answer to step 103 is YES, i.e., when F_MCND=1, it is determined whether or not a value resulting from a subtraction of the atmospheric temperature TA detected by the atmospheric temperature sensor 29 from the engine water temperature TW is larger than a predetermined value DT (step 104). If the answer to step 104 is YES, i.e., when TW−TA<DT, the ECU 30 searches a table, not shown, in accordance with the engine water temperature TW to calculate a determination value VHUMD_JUDO for determining a deterioration of the adsorbent 11 (step 105) on the assumption that the engine water temperature TW has been lowered to a temperature substantially equal to the atmospheric temperature TA, i.e., the adsorbent 11 has been sufficiently lowered to a temperature substantially equal to the atmospheric temperature TA so that the humidity near the adsorbent 11 is substantially constant. The determination value VHUMD_JUDO is set smaller as the engine water temperature TW is lower.

At next step 106, it is determined whether or not the relative humidity VHUMD detected by the humidity sensor 21 is equal to or lower than the determination value VHUMD_JUDO. If the answer to step 106 is YES, i.e., when VHUMD≦VHUMD_JUDO, the ECU 30 determines that the adsorbent 11 has a high moisture adsorbing ability and therefore is not deteriorated, and sets a deterioration flag F_TRSDT to "0" for indicating this fact (step 107), followed by termination of the deterioration determination routine.

If the answer to step 106 is NO, i.e., when VHUMD>VHUMD_JUDO, the ECU 30 determines that the adsorbent 11 has a lower moisture adsorbing ability and is therefore deteriorated, and sets the deterioration flag F_TRSDT to "1" (step 108), followed by termination of the deterioration determination routine.

On the other hand, if the answer to step 104 is NO, i.e., when TW−TA≧DT, in other words, when the adsorbent 11 has not been cooled down to a temperature substantially equal to the atmospheric temperature TA, the ECU 30 increments a counter C_DONE indicative of the number of times the deterioration determination is executed (step 109), on the assumption that the relative humidity VHUMD is not constant and hence not suitable for the deterioration determination. It is then determined whether or not the value on the counter C_DONE is equal to or less than an upper limit value N (step 110). The counter C_DONE is initialized to "0" when the operation of the engine 1 is stopped, and is held while the engine 1 is stopped.

If the answer to step 110 is YES, i.e., when C_DONE≦N, a set time for the aforementioned off timer used to re-start the ECU 30 in a predetermined time after the engine 1 is stopped is set again to a first predetermined time Δt (for example, 30 minutes) shorter than the aforementioned predetermined time (step 111), followed by termination of the deterioration determination routine. Thus, this routine is once interrupted, and resumed after the lapse of the first predetermined time Δt when the ECU 30 is started again. Then, in the resumed routine, if the answer to step 104 is YES, the ECU 30 responsively executes steps 105 onward to execute the deterioration determination.

On the other hand, if the answer to step 104 is still NO even in the resumed routine, and if the answer to step 110 is NO, i.e., when the engine water temperature TW does not converge to the atmospheric temperature TA even after the lapse of the time corresponding to the upper limit value N further from the predetermined time after the engine 1 has been stopped, the deterioration determination routine is terminated on the assumption that a deterioration cannot be properly determined for the adsorbent 11.

As described above in detail, according to the routine for determining a deterioration of the adsorbent 11 after the engine 1 is stopped, since a deterioration is determined for the adsorbent 11 using the relative humidity VHUMD detected when the humidity near the adsorbent 11 is constant, the humidity sensor 21 for use in the determination can be inexpensive one which is relatively low in responsibility. Also, similar to the routine for determining a deterioration of the adsorbent 11 during an operation of the engine 1 illustrated in FIG. 10, the deterioration determination is executed for the adsorbent 11 in accordance with the humidity near the adsorbent 11 detected by the humidity sensor 21 under condition that the heat cleaning control is completed. It is therefore possible to accurately determine a deterioration of the adsorbent 11 even after the engine 1 is stopped, while ensuring elimination of the influence by impurities sticking on the sensor element 21a of the humidity sensor 21.

It should be understood that the present invention is not limited to the embodiment described above, but may be practiced in a variety of manners. For example, while impurities sticking on the sensor element 21a are removed by the heat cleaning, any other proper means may be used instead as long as it can remove impurities. While in the foregoing embodiment, the humidity sensor 21 is disposed at a location downstream of the adsorbent 11, a plurality of adsorbents 11 may be arranged in the exhaust pipe 4, and the humidity sensor 21 may be disposed between these adsorbent 11. Otherwise, details in configuration may be modified as appropriate without departing from the scope and spirit of the invention.

As described above in detail, the adsorbent state determining apparatus according to the present invention can advantageously determine with a high accuracy the state of an adsorbent, including a deterioration, while ensuring elimination of the influence by impurities sticking on a sensor element of the humidity sensor.

What is claimed is:

1. An adsorbent state determining apparatus for determining a state of an adsorbent disposed in an exhaust system of an internal combustion engine for purifying exhaust gases, said adsorbent capable of adsorbing hydrocarbons and moisture within exhaust gases, said apparatus comprising:

a humidity sensor disposed near said adsorbent in said exhaust system for detecting a humidity of exhaust gases;

cleaning executing means for executing cleaning for removing impurities sticking on a sensor element of said humidity sensor;

cleaning completion determining means for determining whether or not said cleaning executing means has completed said cleaning; and adsorbent state determining means for determining the state of said adsorbent in accordance with the humidity of exhaust gases detected by said humidity sensor when said cleaning completion determining means determines that said cleaning is completed.

2. An adsorbent state determining apparatus according to claim 1, wherein said cleaning executing means comprises a heat cleaning means for heating said sensor element of said humidity sensor to remove impurities.

3. An adsorbent state determining apparatus according to claim 1, wherein said adsorbent state determining means determines a deterioration of said adsorbent as the state of said adsorbent.

* * * * *